United States Patent
McKay et al.

(10) Patent No.: US 9,310,017 B2
(45) Date of Patent: Apr. 12, 2016

(54) MANUALLY-OPERATED CRANE ASSEMBLY WITH CONTROL HANDLE

(71) Applicant: Thomas L. McKay, Austin, TX (US)

(72) Inventors: Thomas L. McKay, Austin, TX (US); Michael Sorensen, Medford, OR (US)

(73) Assignee: Thomas L. McKay, Austin, TX (US)

( * ) Notice: Subject to any disclaimer, the term of this patent is extended or adjusted under 35 U.S.C. 154(b) by 171 days.

(21) Appl. No.: 14/050,015

(22) Filed: Oct. 9, 2013

(65) Prior Publication Data

US 2014/0097307 A1    Apr. 10, 2014

Related U.S. Application Data

(60) Provisional application No. 61/711,913, filed on Oct. 10, 2012.

(51) Int. Cl.
| | | |
|---|---|---|
| F16M 11/42 | (2006.01) | |
| F16M 11/04 | (2006.01) | |
| G05G 1/04 | (2006.01) | |
| F16M 11/20 | (2006.01) | |

(52) U.S. Cl.
CPC ............. *F16M 11/04* (2013.01); *F16M 11/20* (2013.01); *F16M 11/2021* (2013.01); *F16M 11/2092* (2013.01); *F16M 11/42* (2013.01); *G05G 1/04* (2013.01); *F16M 2200/044* (2013.01); *Y10T 74/20732* (2015.01)

(58) Field of Classification Search
CPC ................................ F16M 11/16; B62B 5/064
See application file for complete search history.

(56) References Cited

U.S. PATENT DOCUMENTS

| | | | | |
|---|---|---|---|---|
| 5,192,963 A | * | 3/1993 | Hill ....................... | B66F 11/048 |
| | | | | 248/280.11 |
| 5,915,723 A | * | 6/1999 | Austin .......................... | 280/651 |
| 6,361,063 B1 | * | 3/2002 | Daeschner ................... | 280/655 |
| 6,466,179 B1 | | 10/2002 | Ehrenberg et al. | |
| 6,478,427 B1 | * | 11/2002 | Morris et al. ................ | 352/243 |
| 6,636,581 B2 | | 10/2003 | Sorenson | |
| 8,006,850 B2 | * | 8/2011 | Rotheisler ............... | B66C 23/14 |
| | | | | 212/196 |
| 2002/0168188 A1 | * | 11/2002 | Fix ........................ | B66F 11/048 |
| | | | | 396/419 |
| 2014/0010525 A1 | * | 1/2014 | Chapman ...................... | 396/428 |

OTHER PUBLICATIONS

JonyJib2 Camera Crane Jib Arm, "JonyJib Product Catalog", JonyJib, Torance, CA, www.jonyjib.com (downloaded Sep. 11, 2012).
Techno-Jib, "The Next Step in the Evolution of the Camera Jib," Techno-Jib Telescopic LLC (2008).

\* cited by examiner

*Primary Examiner* — Clayton E LaBalle
*Assistant Examiner* — Noam Reisner
(74) *Attorney, Agent, or Firm* — Westerman, Hattori, Daniels & Adrian, LLP (57) ABSTRACT

A control handle for mounting on a forward end of a tail section of a crane having a crane pivot axis includes a normally-engaged brake mechanism thereon for maintaining the control handle in a fixed position until disengaged by an operator, the control handle when disengaged being rotatable about a pivot axis parallel to the crane pivot axis. A crane assembly incorporating the control handle includes a wheeled dolly, a telescopic crane pivotably mounted on the wheeled dolly about a crane pivot axis, the telescopic crane having a forward end, and a rearward end opposite the forward end, a telescopic boom at the forward end, and a tail section at the rearward end. The control handle is mounted on the forward end of the tail section.

13 Claims, 10 Drawing Sheets

MANUALLY-OPERATED CRANE ASSEMBLY WITH CONTROL HANDLE

CROSS-REFERENCE TO RELATED APPLICATION AND INCORPORATION BY REFERENCE

The present patent application is based on, and claims priority from, U.S. provisional Application No. 61/711,913, filed Oct. 10, 2012, which is incorporated herein by reference in its entirety.

BACKGROUND OF THE INVENTION

1. Field of the Invention

The present invention relates to a control handle for manually-operated cranes, and to a crane assembly incorporating such a handle. More specifically, the invention relates to a handle for controlling the angle of a manually-operated, telescopic camera crane and to a crane assembly incorporating such a handle.

2. Description of Related Art Including Information Disclosed Under 37 CFR §§1.97 and 1.98

In filmmaking and video production, a crane shot is a shot taken by a camera on a crane. The most obvious uses are to view the actors from above or to move up and away from them, a common way of ending a movie. Some filmmakers like to have the camera on a boom arm just to make it easier to move around between ordinary set-ups. Most cranes accommodate both the camera and an operator, but some can be operated by remote control. They are usually, but not always, found in what are supposed to be emotional or suspenseful scenes.

Presently, the telescopic camera crane is an essential part of the film and video production for both small and large set productions. Examples of such cranes are the JonyJib2 Camera Crane Jib Ann sold by TonyJib of Turlock, Calif. and the Techno-Jib telescoping jib arm sold by Telescopic LLC of North Hollywood, Calif. The current state of the art provides discreet crane solutions adapted to either small or large scale productions. All such cranes use counterweights to balance the weight of the crane and the camera. Because of a crane's dimensions, the operator may have to reach up a considerable height or bend down all the way in order to adjust the crane's angle.

It is to the solution of these and other problems that the present invention is directed.

BRIEF SUMMARY OF THE INVENTION

It is accordingly a primary object of the present invention to provide a camera crane assembly with a control handle that allows the operator to operate the crane at any positive or negative elevation from a comfortable hand position.

This and other objects of the invention are achieved by the provision of a crane assembly having a wheeled dolly, a telescopic crane pivotally mounted on the wheeled dolly and having a telescopic boom at its forward end and a tail section at its rearward end, and a control handle attached to the forward end of the tail section. A normally-engaged caliper-type brake mechanism on the control handle maintains the control handle in a fixed position until disengaged by an operator.

The control handle can be used as an opposing force to change the elevation of the crane, so that the position of the crane can be controlled dynamically.

Other objects, features and advantages of the present invention will be apparent to those skilled in the ail upon a reading of this specification including the accompanying drawings.

BRIEF DESCRIPTION OF THE SEVERAL VTFWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1:
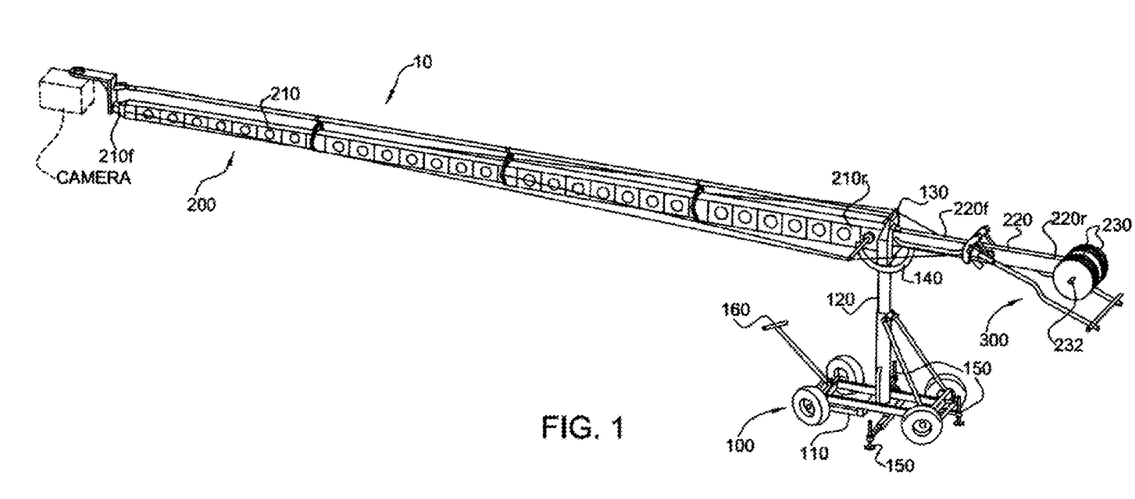
FIGS. 1 and 2 are side and top perspective views, respectively, of a camera crane assembly with a control handle, in accordance with the present invention.
Figure 2:
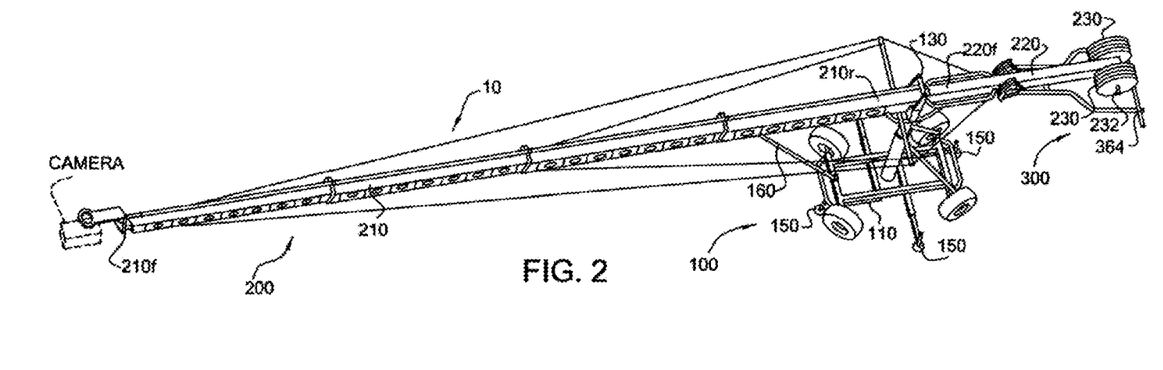
Figure 3:
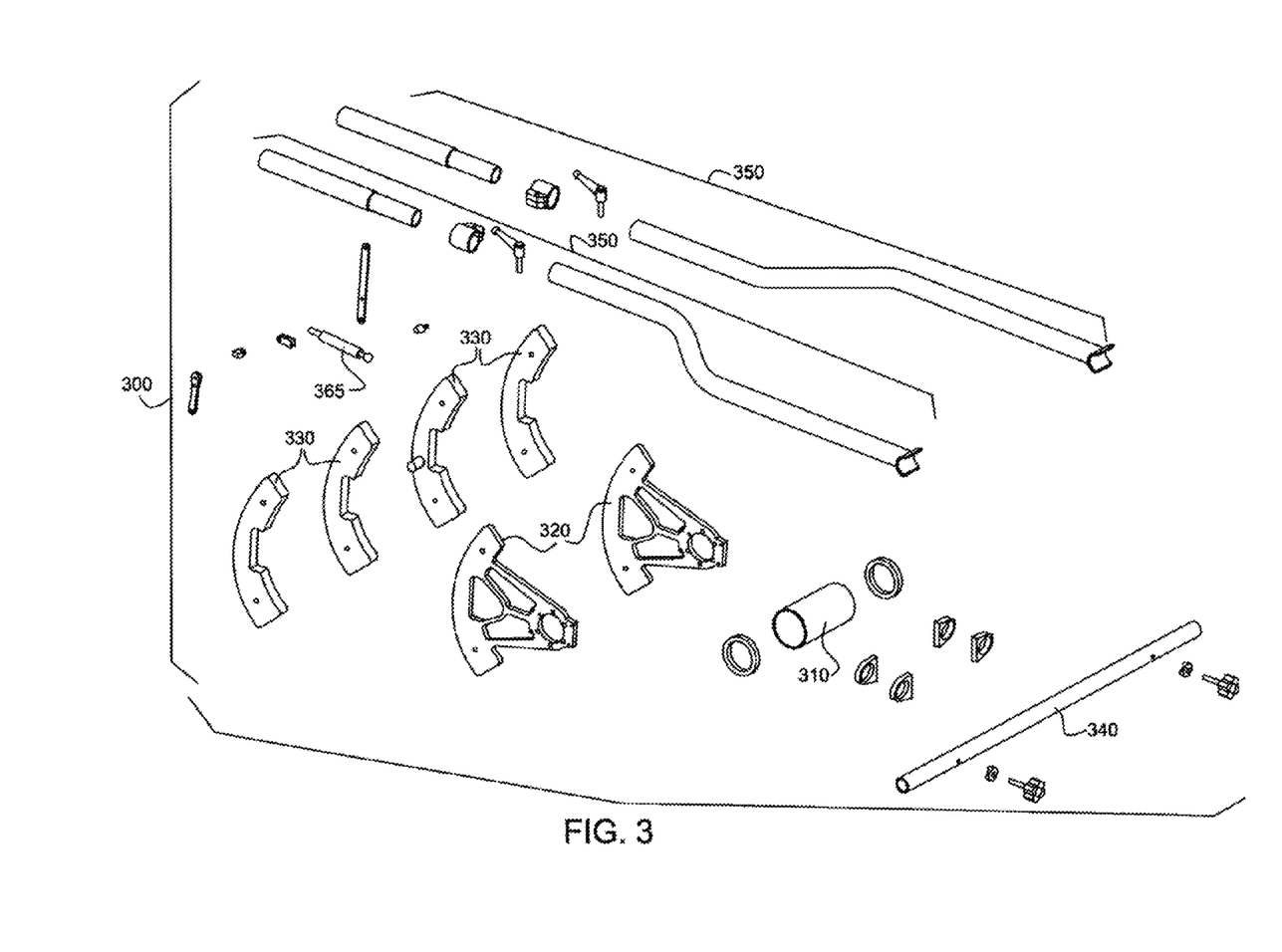
FIG. 3 is an exploded view of the control handle.
Figure 4:
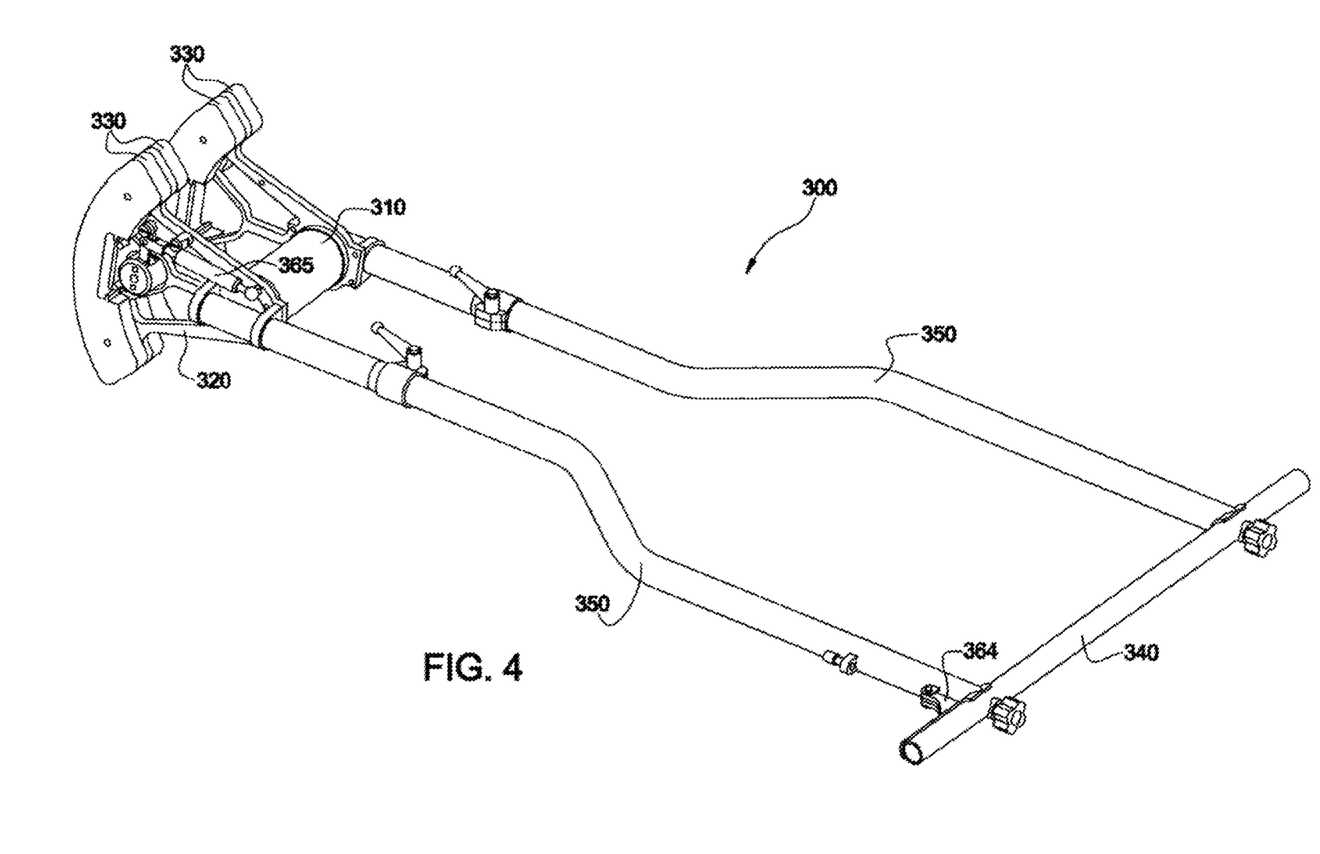
FIG. 4 is a perspective view of the control handle shown in FIG. 3, and brake mechanism.
Figure 5:
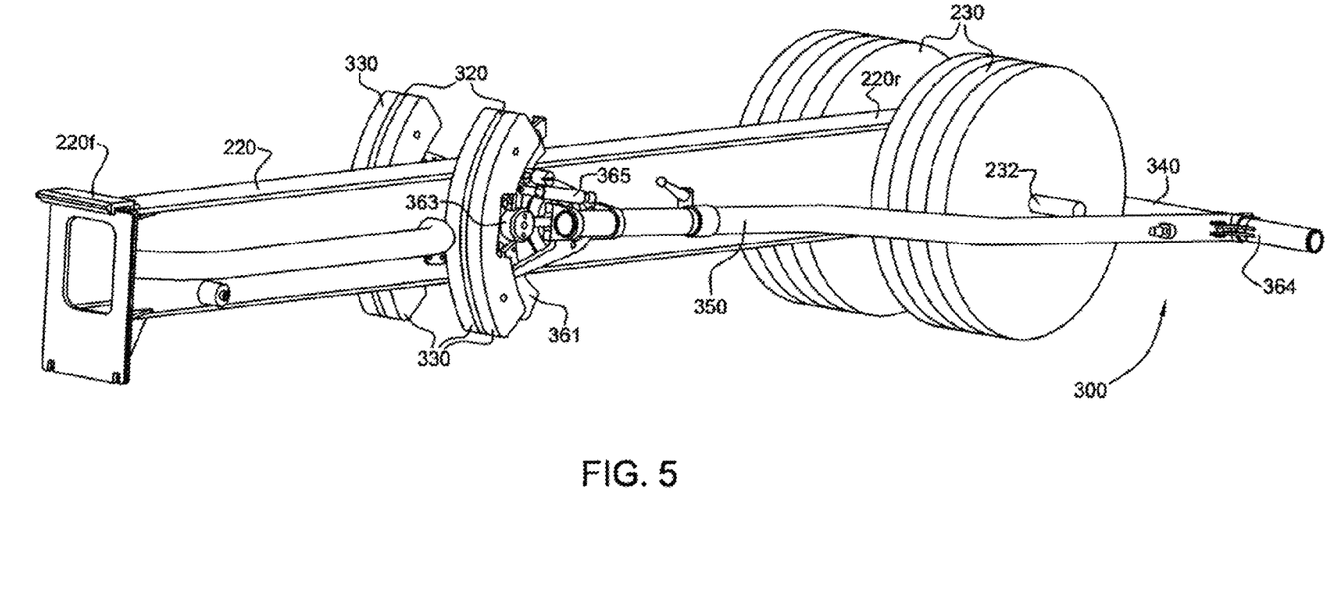
FIGS. 5, 6, 7, and 8 are left side perspective, top plan, left side elevational, and rear elevational views, respectively, of the tail section with the control handle and brake mechanism positioned thereon.
Figure 6:
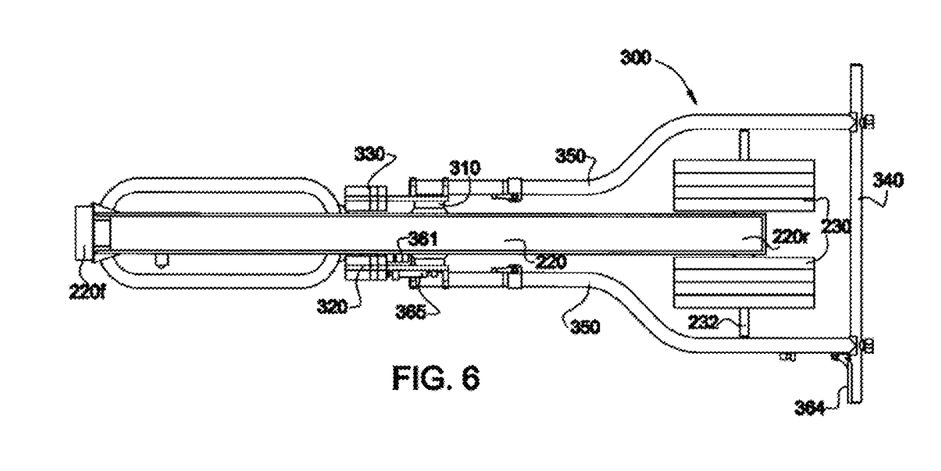
Figure 7:
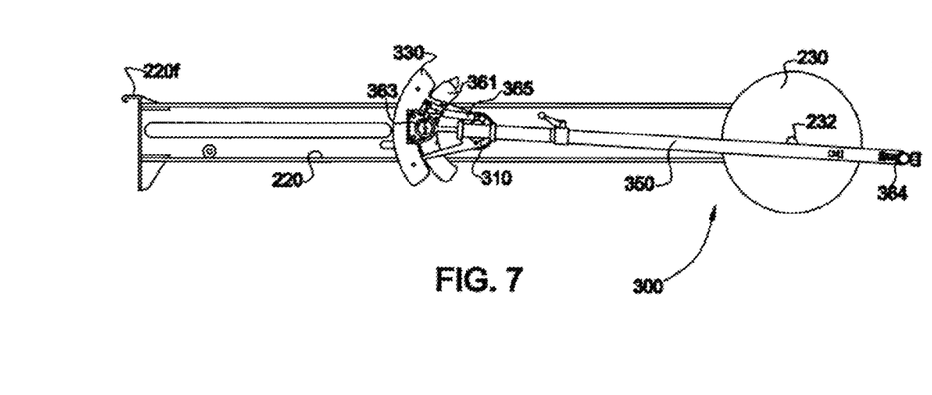
Figure 8:
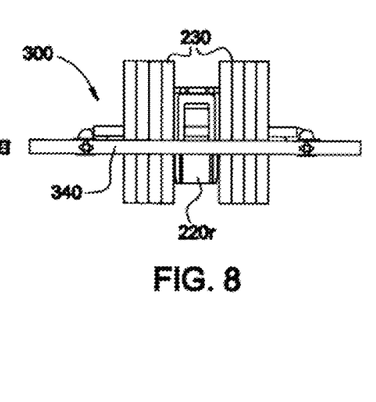
Figure 9:
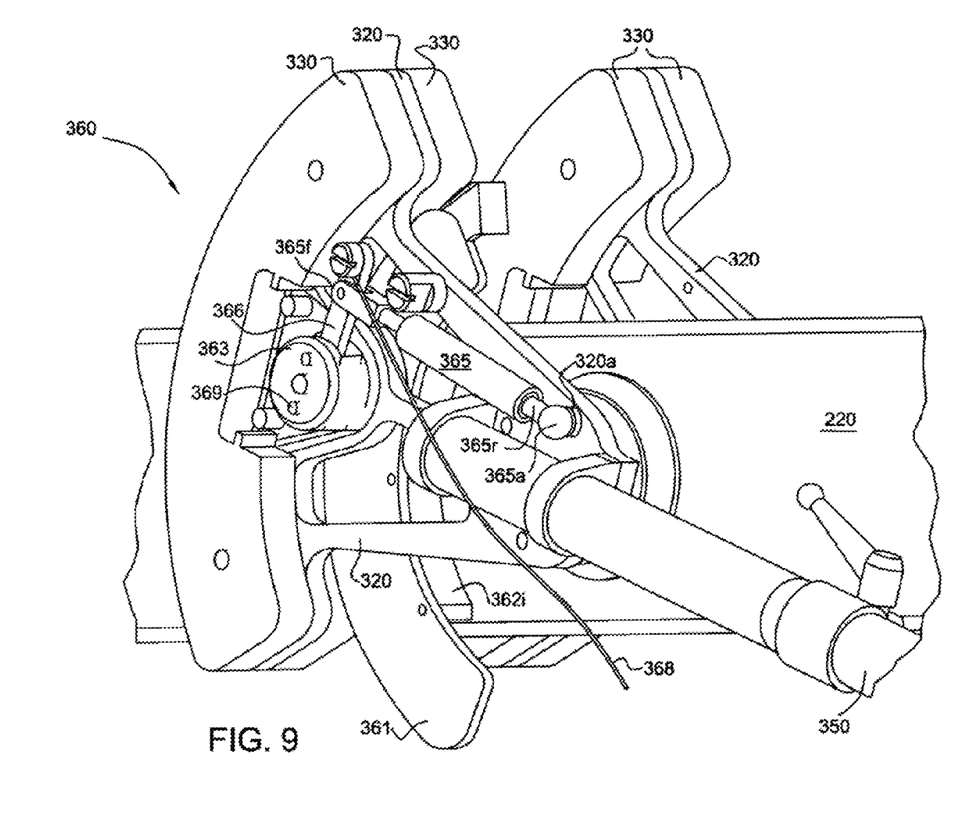
FIG. 9 is an enlarged perspective view of the brake mechanism.
Figure 10:
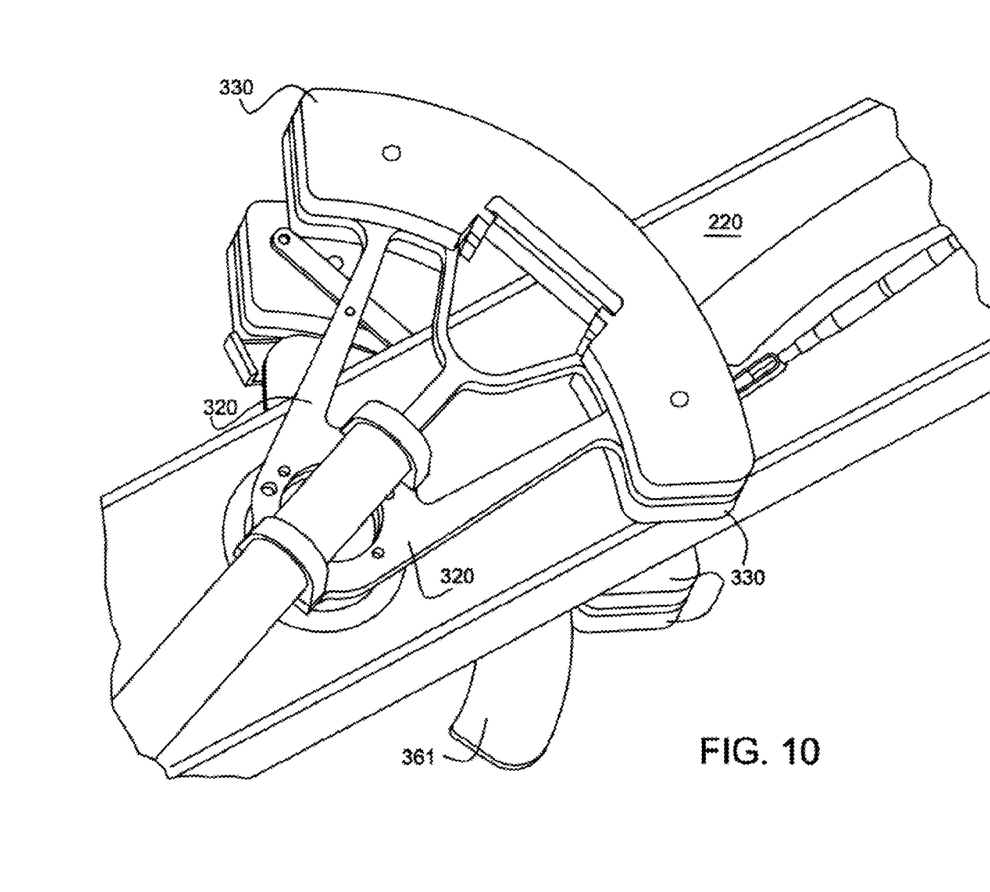
FIG. 10 is an opposite perspective view from FIG. 9.
Figure 11:
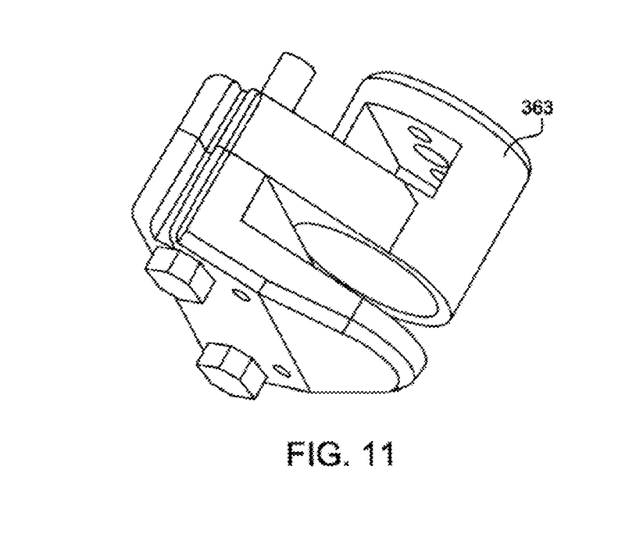
FIG. 11 is a perspective view of the caliper housing of the brake mechanism

As shown in FIGS. 1 and 2, the crane assembly 10 in accordance with the present invention comprises a wheeled dolly 100, a telescopic crane 200 pivotably mounted on the wheeled dolly 100, and a control handle 300 attached to the crane 200.

The dolly 100 includes a wheeled frame 110, a vertical gear-driven pedestal 120 extending upwardly from the wheeled frame 110, and a fork 130 mounted at the top of the pedestal 120 for pivotably mounting the crane 200 about a horizontal pivot axis, all of which are conventional and well-known to those of ordinary skill in the art. A caliper brake 140 actuated by a knob (not shown) on the fork 130 is used to fix the elevational position of the crane 200. Leveling outriggers 150 extend from the sides, front, and back of the wheeled frame 110 to provide a maximum circle of stability. A handle 160 is mounted to the front of the frame 110 to enable the operator to steer, push, and pull the dolly 100 manually.

The crane 200 includes a telescopic boom 210 forward of the horizontal pivot axis and a tail section 220 rearward of the horizontal pivot axis. The telescopic boom 210 has a forward end 200f for mounting a camera and a rearward end 200r opposite the forward end 200f The tail section 220 has a forward end 220f attached to the rearward end 210r of the boom 210 and a rearward end 220r for mounting primary counterweights 230 on a weight bar 232. Henceforth, "forward" is used to denote the direction towards which the camera is mounted and "rearward" is used to denote the opposite direction, which is the direction towards which the primary counterweights 230 are mounted, and at which a crane operator is positioned.

The telescopic boom 210 can be extended and retracted using any of a variety of conventional mechanisms. In one embodiment, the boom 210 has a telescopic, manually-adjustable reach from 7 feet when fully retracted (which allows for easy transport and setup) to 24 feet when fully extended, and a lightweight construction that minimizes material while maximizing rigidity.

Referring now to FIGS. 5-10, the control handle 300 is mounted on the tail section 220 via an axle 310 extending through the tail section 220 parallel to the pivot axis of the crane 200 at a position intermediate the forward and rearward ends of the tail section 220. The control handle 300 includes left and right frames 320 attached to the ends of the axle 310 on either side of the tail section 220, left and right pairs of counterweights 330 attached to the left and right frames 320, respectively, a handlebar 340, left and right control arms 350 attaching the handlebar 340 to the left and right frames 320, and a normally-engaged brake mechanism 360.

As shown in greater detail in FIGS. 9-13, the brake mechanism 360 preferably is a caliper brake mechanism that comprises a fixed rotor 361, inner and outer brake pads 362i and 362o associated with the rotor 361, a caliper housing 363 for retaining the inner and outer brake pads 362i and 362o, a hand grip 364 attached to the left control arm 350 forwardly of the handle, a gas spring 365 normally biased in the extended position, a lever 366 integral with the caliper housing 363, a rod 367 residing between the lever 366 and the outer brake pad 362o, and a cable 368 operated by the hand grip 364 for actuating the brake mechanism 360. The outer brake pad 362o is axially movable within caliper housing 363, while the inner brake pad 362i is semi-fixed within the caliper housing 363 spaced inwardly from the outer brake pad 362o so that the rotor 361 can be received therebetween.

The forward end 365f of the gas spring 365 is rotatably attached to the lever 366, while the rearward end 365r of the gas spring 365 has a ball socket 365a that snaps over a mating ball joint 320a threaded into the left frame 320 of the control handle 320. The lever 366 rotates. on a pin 369 in the caliper housing 363 to actuate the rod 367 as described hereinafter, when the cable 368 is relaxed. When the cable 368 is tightened (by pulling rearwardly on the attached hand grip 364), it pulls the lever 366 rearwardly. The rearward motion of the lever 366 compresses the gas spring 365, releasing the brake pad 362 and allowing the control handle 300 to be rotated. The brake mechanism 360 is normally engaged the gas spring 365 is normally biased in the extended condition to push against the actuator of the caliper 363 and clamp onto the rotor 361, thus locking the position of the control handle 300. The brake mechanism is disengaged by pulling backwards (towards the handlebar 340 and the rearward end of the tail section 220) on the hand grip 364, which pulls on the cable 368 and causes it to pull on the lever 366 integral with the caliper 363.

Figure 12:
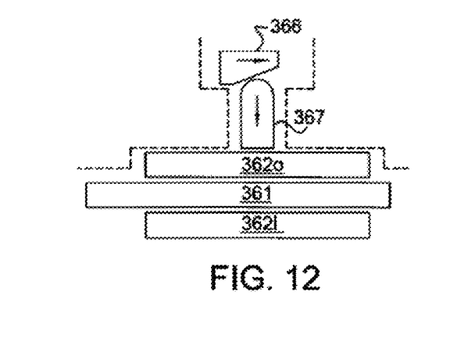
FIG. 12 is a cross-sectional view of a portion of the brake mechanism, a portion of the caliper housing being shown in broken lines.
Figure 12A:
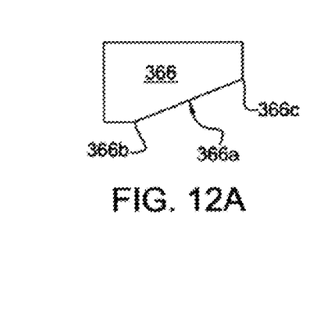
FIG. 12A is an enlarged cross-sectional view of the lever shown in FIG. 12.
Figure 13:
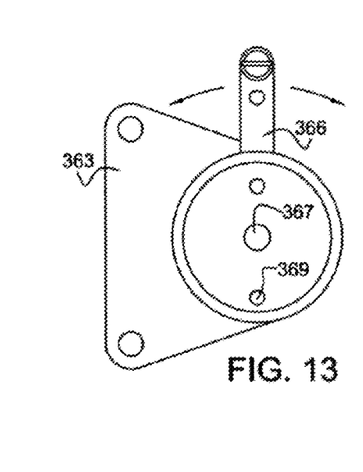
FIG. 13 is a top plan view of portion of the brake mechanism shown in FIG. 12.

The rod 367 is not attached to either the lever 366 or the outer brake pad 362o, but rather is free-floating between them. The rod 367 depresses the outer brake pad 362o against the rotor 361 via a camming action of the lever 366 when the cable 368 is relaxed. The surface 366a of the lever 366 facing the rod 367 is wedge-shaped, which enables the camming action. The end of the rod 367 facing the wedge-shaped surface 366a is rounded, so as the lever 366 pivots on the pin 369, the wedge-shaped surface 366a passes over the end of the rod 367, pressing down progressively more on the end of the rod 367 as the point of contact between the lever 366 and the rod 367 approaches the apex 366b of the wedge-shaped surface 366a, creating the camming action. When the lever 366 is forward in the normal (default) position, the apex 366b of the wedge-shaped surface 366a is in contact with the rod 367, and therefore the camming action is at its most fully engaged and the outer brake pad 362o is fully depressed. When the lever 366 is retracted by the operator squeezing the hand grip 364, the base of the wedge-shaped surface of the lever 366 contacts the rod 367, the camming action is at its lowest engagement, and the outer brake pad 362o is therefore disengaged from the rotor 361.

It will be appreciated that while the brake mechanism 360 is shown and described as being located on the left side of the crane assembly 10, it can equally well be located on the right side.

Figure 14A:
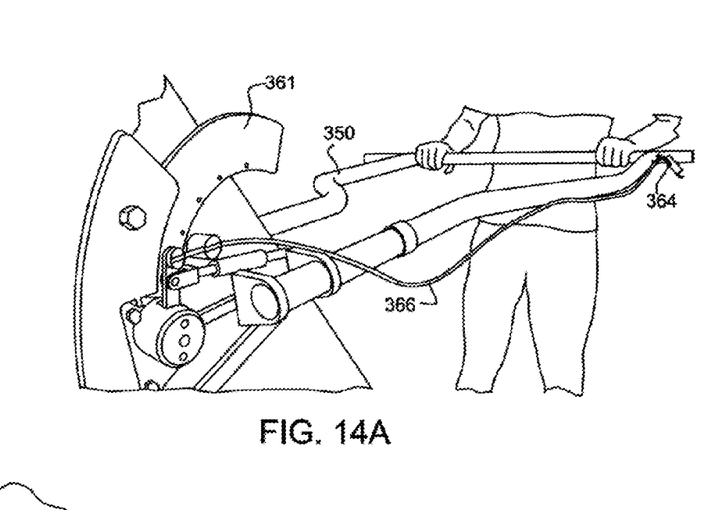
FIGS. 14A, 14B, and 14C show the control handle in use by an operator.
Figure 14B:
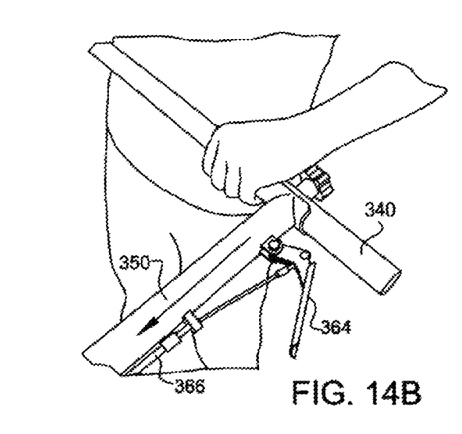
Figure 14C:
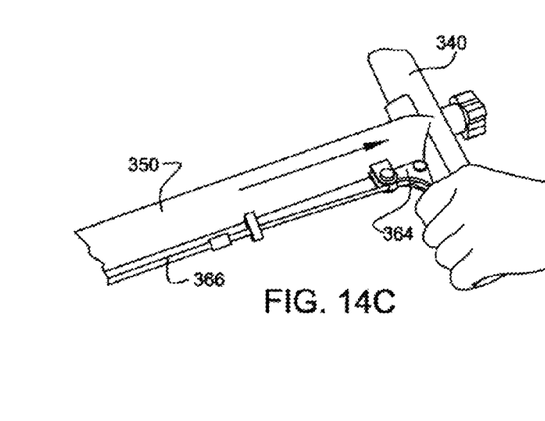

Referring now to FIGS. 14A-14C, the operating position of the crane 200 is changed by pushing up or down on the handlebar 340 while the brake mechanism 360 is engaged. To free the position of the control handle 300, the operator pulls backwards on the hand grip 364. The crane 200 will continue to move in the direction in which the operator has pushed until the operator releases the hand grip 364. When the hand grip 364 is released, the brake mechanism will re-engage and bring the crane's motion to a gradual halt. By combining the guiding force for inclination or declination with the braking action suiting from release of the hand grip 364, the operator can maintain a consistent position of the control handle 300 within a few inches, upwardly or downwardly.

The brake mechanism 360 this fixes the position of the handlebar 340 so the handlebar 340 can be used as an opposing force to change the elevation of the crane 200. The knob-actuated caliper brake 140 at the fork 130, at the fulcrum (main pivot point) of the crane 200 (where the crane 200 pivots at the top of the pedestal 120), is used to fix the elevational position of the crane 200 when the operator wants it to remain at a fixed elevation or add drag to elevational changes. The caliper brake 140 at the fulcrum of the crane 200 does not lock, but rather, adds drag, so when the crane 200 is fully balanced, it will maintain its elevation until outside forces affect it, with the caliper brake 140 adding substantial resistance to changes in elevation.

Figure 15:
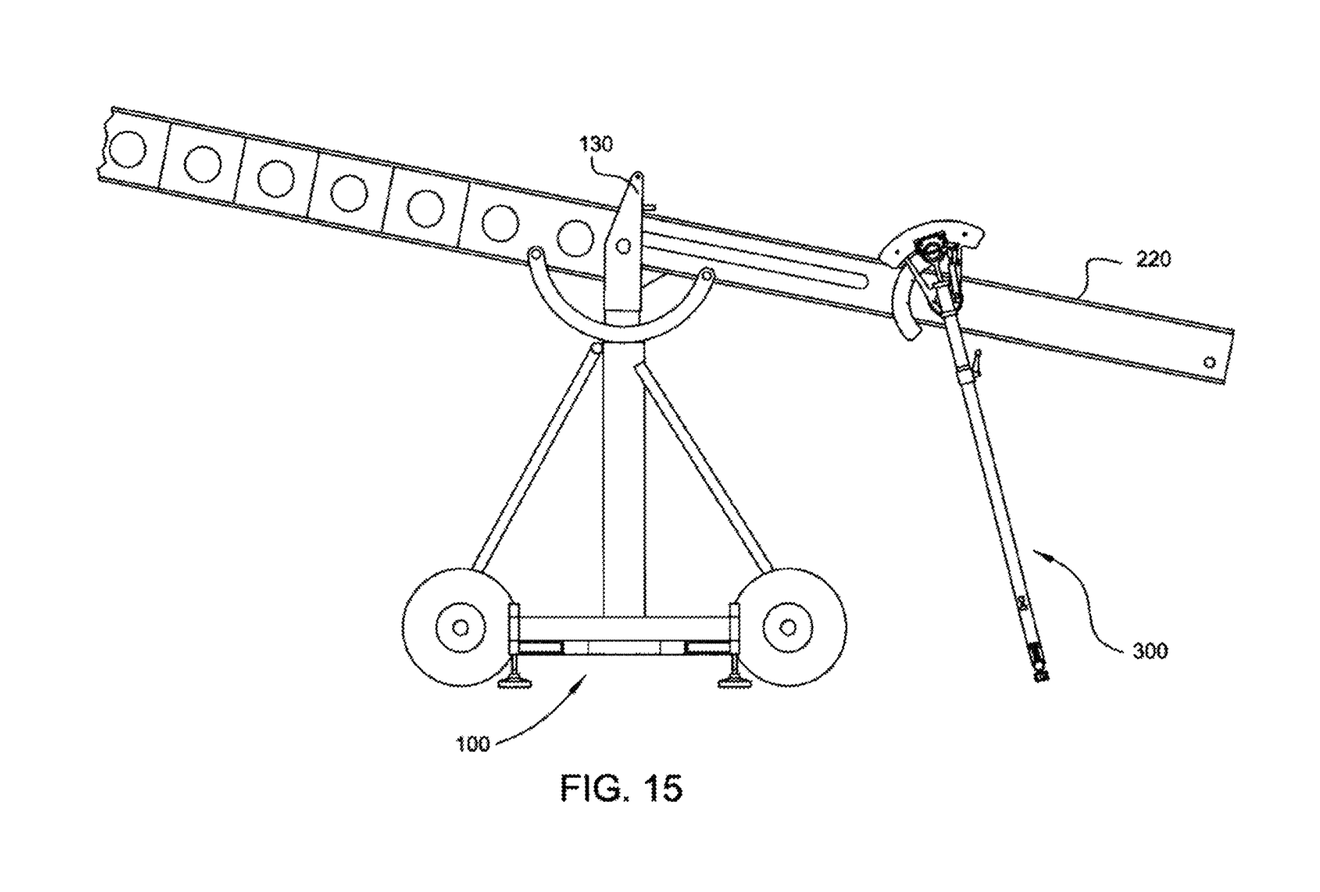
FIG. 15 is a perspective view of the camera crane assembly with the control handle in use as a kickstand.

The control handle 300 can also function as a "kickstand" by positioning it under the tail section 220, as shown in FIG. 15.

Modifications and variations of the above-described embodiments of the present invention are possible, as appreciated by those skilled in the art in light of the above teachings. For example, the hand grip 364 can be replaced by a rotating knob and/or screw tightening mechanism. As will be appreciated by those of skill in the art, such a mechanism would be incorporated into the control handle 300 in the same way as the hand grip 364, but the user would manipulate it differently than the hand grip 364 to retract the cable 368. Instead of pulling back on the hand grip 364, the user would turn a wheel (knob) and/or screw drive mechanism to provide mechanical advantage for pulling the cable 368 backward. It is therefore to be understood that, within the scope of the appended claims and their equivalents, the invention may be practiced otherwise than as specifically described.

What is claimed is:

1. A crane assembly comprising:
a wheeled dolly,
a telescopic crane pivotably mounted on the wheeled dolly about a crane pivot axis, the telescopic crane having a forward end, a rearward end opposite the forward end, a telescopic boom at the forward end, and a tail section at the rearward end, the tail section having a forward end and a rearward end, and
a control handle mounted on the tail section intermediate the forward and rearward ends thereof, the control handle having a normally-engaged caliper brake mechanism thereon for maintaining the control handle in a fixed position until disengaged by an operator, the control handle when disengaged being rotatable about a pivot axis parallel to the crane pivot axis, wherein the brake mechanism includes:
a hand grip;
a cable operated by the hand grip for releasing the brake mechanism and allowing the control handle to be rotated;
a fixed rotor;
a first brake pad and second brake pad spaced from the first brake pad with the rotor received therebetween, the first brake pad being axially movable relative to the rotor and the second brake pad being semi-fixed;
a lever rotatable between forward and rearward positions in response to operation of the cable to move the outer brake pad relative to the rotor;
a rod free-floating between the lever and the outer brake pad, the rod being actuated by rotation of the lever to move the first brake pad axially relative to the rotor; and
a spring normally biased in an extended position to lock the position of the control handle and having forward and rearward ends, the forward end being rotatably attached to the lever and the rearward end being rotatably coupled to the control handle.

2. A crane assembly comprising:
a wheeled dolly,
a telescopic crane pivotably mounted on the wheeled dolly about a crane pivot axis, the telescopic crane having a forward end, a rearward end opposite the forward e a telescopic boom at the forward end, and a tail section at the rearward end, and
a control handle mounted on the tail section of the crane at a position intermediate the forward and rearward ends of the tail section, the control handle having a normally-engaged caliper brake mechanism thereon for maintaining t e control handle in a fixed position until disengaged by an operator, the control handle when disengaged being rotatable about a pivot axis parallel to the crane pivot axis, wherein the control handle is rotatable for positioning under the tail section to function as a kickstand.

3. The crane assembly of claim 2, the control handle further comprising:
left and right frames pivotably mountable on the forward end of the tail section about a pivot axis parallel to the crane pivot axis;
left and right control handle counterweights attached to the left and right frames, respectively;
a handlebar; and
left and right control arms attaching the handlebar to the left and right frames.

4. The crane assembly of claim 2, wherein the brake mechanism is a caliper brake mechanism.

5. The crane assembly of claim 4, wherein the brake mechanism includes a hand grip and a cable operated by the hand grip for releasing the brake mechanism and allowing the control handle to be rotated.

6. The crane assembly of claim 2, wherein the tail section has a forward end attached to the rearward end of the boom and a rearward end opposite the forward end, and means for mounting primary counterweights at the rearward end of the tail section.

7. The crane assembly of claim 2, wherein the control handle is pivotably mounted on the forward end of the tail section, and includes left and right control handle counterweights on either side of the tail section.

8. The crane assembly of claim 7, wherein the control handle further includes:
left and right frames on either side of the tail section,
a handlebar, and
left and right control arms attaching the handlebar to the left and right frames; and
wherein the left and right control handle counterweights are attached to the left and right frames, respectively.

9. The crane assembly of claim 8, wherein the brake mechanism includes a hand grip and a cable operated by the hand grip for releasing the brake mechanism and allowing the control handle to be rotated.

10. A method of operating the crane assembly of claim 9 by combining a guiding force for inclination and declination of the crane with a braking action provided by the brake mechanism to maintain a position of the control handle with a consistency within a few inches, upwardly or downwardly, the method comprising the steps of:
changing the operating position of the crane by pushing up or down on the handlebar while the brake mechanism is engaged;
freeing the position of the control handle by disengaging the brake mechanism;
after the step of freeing the position of the control handle, allowing the crane to continue to move in the direction in which it was pushed in the step of changing the operating position of the crane, until it reaches a desired position;
once the crane reaches a desired position, re-engaging the brake mechanism to bring the motion of the crane to a gradual halt.

11. The method of claim 10, wherein in the step of freeing the position of the control handle the brake mechanism is disengaged by pulling on the hand grip, and the step of re-engaging the brake mechanism comprises releasing the hand grip.

12. A crane assembly comprising: a wheeled dolly, a telescopic crane pivotably mounted on the wheeled dolly about a crane pivot axis, the telescopic crane having a longitudinal axis perpendicular to the crane pivot axis, a forward end, a rearward end opposite the forward end, a telescopic boom at the forward end, and a tail section at the rearward end, the tail section having a forward end and a rearward end, the forward end being attached to the rearward end of the tail section, at least one counterweight attached to the rearward end of the tail section, and control handle rotatably mounted on the tail section of the crane about a control handle pivot axis parallel to the crane pivot axis and intermediate the forward and rearward ends of the tail section, the control handle having a hand grip spaced rearwardly of the control handle pivot axis at a position rearward of the at least one counterweight and a normally-engaged brake mechanism proximate the hand grip for maintaining the control handle in a fixed position relative to the control handle pivot axis until disengaged by an operator, the control handle being rotatable about the control handle pivot axis when the brake mechanism is disengaged between upper and lower positions in which the hand grip is respectively higher than and lower than the tail section, to adjust the position of the hand grip relative to the control handle pivot axis and the position of the control handle relative to the longitudinal axis of the crane, wherein the crane is pivotable about the crane pivot axis in response to upward and downward force on the control handle while the brake mechanism is engaged, wherein the control handle is rotatable for positioning under the tail section to function as a kickstand.

13. A method of operating the crane assembly of claim 12 by combining a guiding force for inclination and declination of the crane with a braking action provided by the brake mechanism to maintain a position of the control handle with a consistency within a few inches, upwardly or downwardly, the method comprising the steps of:

changing the operating position of the crane by pushing up or down on the control handle while the brake mechanism is engaged;

freeing the position of the control handle by disengaging the brake mechanism;

after the step of freeing the position of the control handle, allowing the crane to continue to move in the direction in which it was pushed in the step of changing the operating position of the crane, until it reaches a desired position;

once the crane reaches a desired position, re-engaging the brake mechanism to bring the motion of the crane to a gradual halt.

* * * * *